United States Patent
Yamaguchi et al.

(10) Patent No.: US 6,590,836 B1
(45) Date of Patent: Jul. 8, 2003

(54) MAGNETO OPTICAL RECORDING MEDIUM CAPABLE OF PREVENTING A REPRODUCTION LAYER FROM HAVING A DEGRADED CHARACTERISTIC

(75) Inventors: Atsushi Yamaguchi, Gifu (JP); Hitoshi Noguchi, Gifu (JP); Hiroki Ishida, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 26 days.

(21) Appl. No.: 09/669,454

(22) Filed: Sep. 25, 2000

(30) Foreign Application Priority Data

Sep. 29, 1999 (JP) .............................. 11-277065

(51) Int. Cl.⁷ .............................................. G11B 11/00
(52) U.S. Cl. ............................... 369/13.45; 428/694 RE
(58) Field of Search ........................... 369/275.1, 275.3, 369/275.4, 275.2, 13.14, 13.08, 13.44, 13.15, 13.12, 13.42, 13.07, 13.46, 13.54, 13.13, 13.45, 13.35, 13.43; 360/59; 428/694 MM, 694 ML, 694 RE

(56) References Cited

U.S. PATENT DOCUMENTS

| | | | | |
|---|---|---|---|---|
| 4,837,118 A | * | 6/1989 | Yamamoto et al. | 428/645 |
| 4,878,132 A | * | 10/1989 | Aratani et al. | 360/59 |
| 4,975,339 A | * | 12/1990 | Yamada et al. | 428/694 DE |
| 5,094,925 A | * | 3/1992 | Ise et al. | 428/694 MM |
| 5,449,566 A | * | 9/1995 | Fujii et al. | 428/694 EC |
| 5,530,685 A | * | 6/1996 | Katayama et al. | 369/13.14 |
| 5,633,746 A | * | 5/1997 | Sekiya et al. | 359/280 |
| 5,633,838 A | * | 5/1997 | Hirokane et al. | 369/13.08 |
| 5,665,467 A | * | 9/1997 | Nakayama et al. | |
| 5,705,286 A | * | 1/1998 | Hirokane et al. | 428/694 ML |
| 5,757,734 A | * | 5/1998 | Nakajima et al. | 369/13.15 |
| 5,757,736 A | * | 5/1998 | Onagi | 369/13 |
| 5,777,953 A | * | 7/1998 | Hirokane et al. | 369/13 |
| 5,838,645 A | * | 11/1998 | Hirokane et al. | 369/13.08 |
| 5,879,822 A | * | 3/1999 | Okada | 428/694 RE |
| 5,889,740 A | * | 3/1999 | Nakayama et al. | 369/13.42 |
| 5,901,118 A | * | 5/1999 | Iketani et al. | 369/13 |
| 5,923,625 A | * | 7/1999 | Shimazaki et al. | 369/13 |
| 5,966,349 A | * | 10/1999 | Suwabe et al. | 369/13 |
| 5,976,688 A | * | 11/1999 | Kawase et al. | |
| 6,128,254 A | * | 10/2000 | Matsumoto et al. | 369/13 |
| 6,324,127 B1 | * | 11/2001 | Kim | 369/13 |

\* cited by examiner

*Primary Examiner*—Ali Neyzari
(74) *Attorney, Agent, or Firm*—Armstrong, Westerman & Hattori, LLP.

(57) ABSTRACT

On a dielectric layer of SiN a reproduction layer, a non-magnetic layer of SiN and a recording layer of TbFeCo are formed to provide a magneto optical recording medium. The reproduction layer is formed of a first layer corresponding to a Gd layer, a second layer formed of GdFeCo and a third layer corresponding to a Gd layer. As such, the magneto optical recording medium, with the non-magnetic layer formed in contact with the reproduction layer, can prevent the non-magnetic layer from affecting the reproduction layer and thus prevent the reproduction layer from having a degraded characteristic.

5 Claims, 11 Drawing Sheets

FIG. 4

| TARGET | Gd |
|---|---|
| Ar FLOW RATE(sccm) | 10 ~ 50 |
| RF POWER(W/cm$^2$) | 0.8 ~ 2.5 |
| REACTION PRESSURE(mTorr) | 7 ~ 10 |
| SUBSTRATE TEMPERATURE(°C) | 40 ~ 80 |

FIG. 5

| TARGET | Gd、FeCo |
|---|---|
| Ar FLOW RATE(sccm) | 10 ~ 50 |
| RF POWER(W/cm$^2$) | 0.8 ~ 4.5 |
| REACTION PRESSURE(mTorr) | 7 ~ 10 |
| SUBSTRATE TEMPERATURE(°C) | 50 ~ 80 |

MAGNETO OPTICAL RECORDING MEDIUM CAPABLE OF PREVENTING A REPRODUCTION LAYER FROM HAVING A DEGRADED CHARACTERISTIC

BACKGROUND OF THE INVENTION

The present invention relates to magneto optical recording media recording a signal through a laser beam and a magnetic field.

DESCRIPTION OF THE BACKGROUND ART

Magneto optical recording media are noted as a recording medium which is rewritable, large in storage capacity and highly reliable and they are increasingly put to practical use as computer memory and the like. Furthermore, a magneto optical recording medium having a recording density of 4.6 Gbits/inch$^2$ has been recently standardized as the Advanced Storaged Magneto Optical disk (AS-MO) standard and is about to be put to practical use.

Furthermore, there has also been proposed a magneto optical recording medium having a recording capacity of 14 Gbytes in a system transferring a magnetic domain of a recording layer to a reproduction layer and enlarging the magnetic domain in the reproduction layer and thus reproducing a signal.

In this system, a signal recorded in the magneto optical recording medium is reproduced by directing a laser beam to apply an alternate magnetic field of approximately ±3000 Oe to transfer each recording domain of the recording layer to the reproduction layer and enlarge the domain in the reproduction layer to reproduce the signal.

In fabricating a conventional magneto optical recording medium having a structure of substrate /SiN/GdFeCo/SiN/ TbFeCo, SiN, GdFeCo, SiN and TbFeCo are successively sputtered on the substrate. As such, when GdFeCo corresponding to a reproduction layer is provided, SiN has already been provided on the substrate. Since GdFeCo, SiN, TbFeCo are sputtered for example in a plasma of argon gas, while GdFeCo is being provided ions of various species in the plasma etch a portion of SiN and GdFeCo takes Si, N and the like therein to. Consequently, the GdFeCo obtained would have a Gd content smaller than a set value and the reproduction layer would have a degraded characteristic.

More specifically, because of a degraded characteristic at an interface of the reproduction layer of GdFeCo layer and another layer, a degraded perpendicular magnetic anisotropy in particular, when a leaking magnetic field extends from the recording layer through a non-magnetic layer and reaches the reproduction layer the reproduction layer's magnetization is not inverted in the same direction as the recording layer's magnetization and a signal can thus not be reproduced accurately.

Furthermore, the plasma's negative effect on GdFeCo also occurs after GdFeCo is provided when SiN is provided. More specifically, when GdFeCo is provided and SiN is then provided, Si, N and the like are disadvantageously introduced through the plasma into GdFeCo. Thus the reproduction layer also would have a degraded characteristic and a signal can thus not be reproduced accurately.

SUMMARY OF THE INVENTION

The present invention therefore contemplates a magneto optical recording medium having a non-magnetic layer formed in contact with a reproduction layer, capable of preventing the non-magnetic layer from affecting the reproduction layer and thus preventing the reproduction layer from having a degraded characteristic.

The present invention provides a magneto optical recording medium including a dielectric layer, a reproduction layer formed in contact with the dielectric layer, a non-magnetic layer formed in contact with the reproduction layer, and a recording layer formed in contact with the non-magnetic layer, the reproduction layer including a first layer corresponding to a rare earth metal layer, a second layer corresponding to an alloy layer of rare earth metal and transition metal formed in contact with the first layer, and a third layer corresponding to a rare earth metal layer formed in contact with the second layer.

In the present magneto optical recording medium the first and second layers can prevent an impurity existing in the dielectric layer and the non-magnetic layer, each arranged on one of opposite sides of the reproduction layer, from entering the alloy layer of rare earth metal and transition metal when the recording medium is being fabricated. As such the present invention can prevent the non-magnetic layer from affecting the reproduction layer and thus prevent the reproduction layer from having a degraded characteristic.

Furthermore the present invention provides a magneto optical recording medium including a dielectric layer, a reproduction layer formed in contact with the dielectric layer, a non-magnetic layer formed in contact with the reproduction layer, and a recording layer formed in contact with the non-magnetic layer, the reproduction layer including a first layer corresponding to a rare earth metal layer formed in contact with the dielectric layer, and a second layer corresponding to an alloy layer of rare earth metal and transition metal.

In the present magneto optical recording medium the first layer can prevent an impurity in the dielectric layer from entering the alloy layer of rare earth metal and transition metal when the recording medium is being fabricated. As such the present invention can prevent the non-magnetic layer from affecting the reproduction layer and thus prevent the reproduction layer from having a degraded characteristic.

Furthermore the present invention provides a magneto optical recording medium including a reproduction layer, a non-magnetic layer formed in contact with the reproduction layer, and a recording layer formed in contact with the non-magnetic layer, the reproduction layer being formed of a first layer corresponding to an alloy layer of rare earth metal and transition metal and a second layer corresponding to a rare earth metal layer formed in contact with the non-magnetic layer.

In the present magneto optical recording medium the second layer can prevent an impurity in the non-magnetic layer from entering the alloy layer of rare earth metal and transition metal when the recording medium is being fabricated. As such the present invention can prevent the non-magnetic layer from affecting the reproduction layer and thus prevent the reproduction layer from having a degraded characteristic.

Preferably, the rare earth metal layer is a Gd layer and the rare earth metal forming the alloy layer is Gd.

Thus the Gd layer can prevent an impurity in the non-magnetic layer from entering the alloy layer of rare earth metal and transition metal when the magneto optical recording medium is being fabricated. As such in the present invention the Gd typically used as a rare earth metal forming a reproduction layer can prevent the reproduction layer from having a degraded characteristic.

Furthermore the present invention provides a magneto optical recording medium including a dielectric layer, a reproduction layer formed in contact with the dielectric layer, a non-magnetic layer formed in contact with the reproduction layer, and a recording layer formed in contact with the non-magnetic layer, wherein the reproduction layer is an alloy layer of rare earth metal and transition metal and contains more of the rare earth metal at a portion thereof closer to the dielectric layer and a portion thereof closer to the non-magnetic layer.

In the present magneto optical recording medium any impurity entering from the non-magnetic layer to the reproduction layer can be held in the reproduction layer at an area containing a large amount of rare earth metal. As such the present invention can prevent the non-magnetic layer from affecting the reproduction layer and thus prevent the reproduction layer from having a degraded characteristic.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIG. 4 presents conditions for providing the Gd layer;

FIG. 5 presents conditions for providing GdFeCo;

DESCRIPTION OF THE PREFERRED EMBODIMENTS

Figure 1:
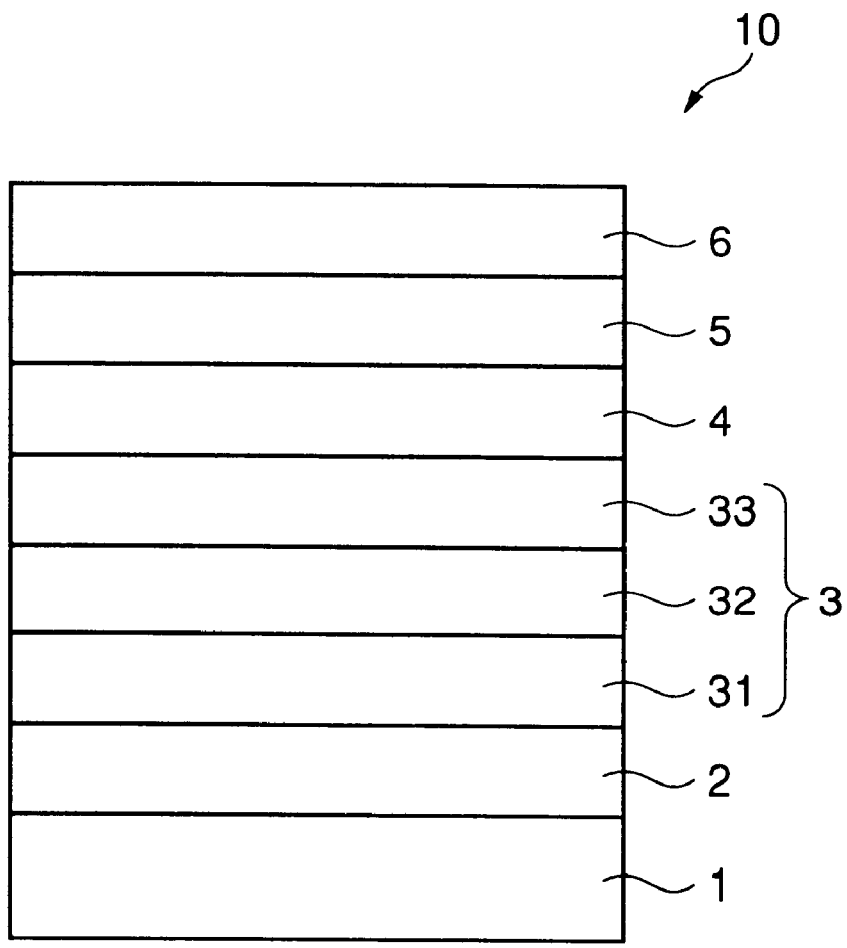
FIG. 1 shows a structure in cross section of a magneto optical recording medium in the present invention.

Hereinafter the embodiments of the present invention will be described with reference to the drawings. As shown in FIG. 1, in accordance with the present invention a magneto optical recording medium 10 includes a transparent substrate 1, a dielectric layer 2 formed on the transparent substrate, a reproduction layer 3 formed on dielectric layer 2, a non-magnetic layer 4 formed on reproduction layer 3, a recording layer 5 formed on non-magnetic layer 4, and a protection layer 6 formed on recording layer 5.

Transparent substrate 1 is formed of glass, polycarbonate and the like, and dielectric layer 2 is formed of SiN. Reproduction layer 3 is formed, as seen from the dielectric layer 2 side, of a first layer 31 corresponding to a rare earth metal layer (Gd), a second layer 32 corresponding to an alloy layer of rare earth metal and transition metal (GdFeCo), and a third layer 33 corresponding to a rare earth metal layer (Gd). Protection layer 6 is formed of UV-cured resin. Non-magnetic layer 4 is formed of SiN and recording layer 5 is formed of TbFeCo.

Dielectric layer 2, reproduction layer 3 (31, 32, 33), non-magnetic layer 4 and recording layer 5 are sputtered. Dielectric layer 2 is 400 to 800 Å thick, reproduction layer 3 is 190 to 900 Å thick, non-magnetic layer 4 is 50 to 500 Å thick, recording layer 5 is 400 to 2500 Å thick, and protection layer 6 is 300 to 800 Å thick. In reproduction layer 3, the first layer 31 is 20 to 100 Å thick, the second layer 32 is 150 to 500 Å thick and the third layer 33 is 20 to 300 Å thick.

Magneto optical recording medium 10 is characterized in that the second layer 32 formed of GdFeCo and the first and third layers 31 and 33 both formed of Gd and together sandwiching the second layer 32 configure reproduction layer 3. Providing the first and third layers 31 and 33 in fabricating magneto optical recording medium 10 can prevent Si atoms, N atoms and the like forming dielectric layer 2 and non-magnetic layer 4 from entering GdFeCo and degrading a characteristic of the GdFeCo layer.

Figure 2A:
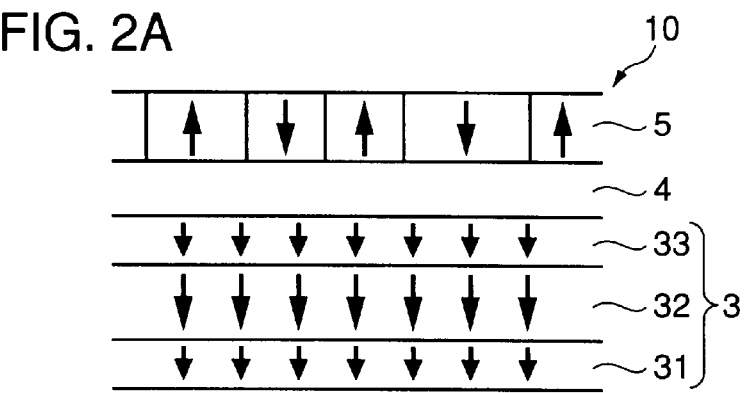
FIG. 2A is a cross section showing an initial stage in a process of reproducing a signal from the FIG. 1 magneto optical recording medium.
Figure 2B:
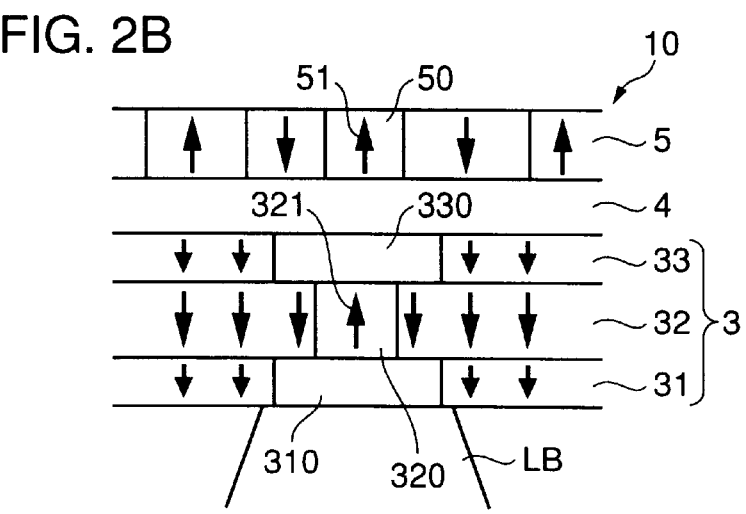
FIG. 2B is a cross section showing transferring a magnetic domain from a recording layer to a reproduction layer in the process of reproducing a signal from the FIG. 1 magneto optical recording medium.
Figure 2C:
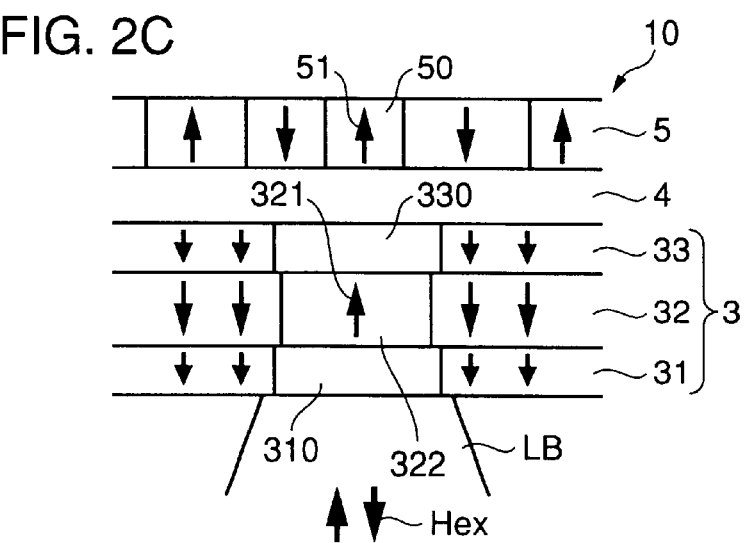
FIG. 2C is a cross section showing enlarging a magnetic field in the process of reproducing a signal from the FIG. 1 magneto optical recording medium.

Reference will now be made to FIGS. 2A–2C to describe a process of reproducing a signal from magneto optical recording medium 10. In starting reproducing a signal, the reproduction layer 3 first, second and third layers 31, 32 and 33 have their magnetization initialized in a direction of an initializing magnetic field, as shown in FIG. 2A.

As shown in FIG. 2B, when the reproduction layer 3 at the first layer 31 receives a laser beam LB of a predetermined intensity, recording layer 5 in a predetermined area is heated and a magnetic field leaking from a magnetic domain 50 is intensified. The reproduction layer 3 first and third layers 31 and 33 are metal layers of Gd and thus have as low a Curie temperature as approximately 50° C. (room temperature). As such, when laser beam LB is directed and a temperature for signal reproduction, i.e., approximately 150° C. is attained there are created in the first layer 31 an area 310 where magnetization has disappeared and in the third layer 33 an area 330 where magnetization has disappeared. As such, the magnetic field leaking from the recording layer's magnetic domain 50 extends through non-magnetic layer 4 and the reproduction layer's third layer 33 area 330 and thus reaches the reproduction layer's second layer 32 magnetic domain 320, which has magnetization 321 in the same direction as magnetization 51 of the recording layer's magnetic domain 50 and the recording layer 5 magnetic domain 50 is transferred to the reproduction layer 3 second layer 32. Laser beam LB radiated on the first layer 31 side that is transmitted through the first layer 31 magnetooptically interacts with the second layer 32 magnetic domain 320, which is thus detected and a signal is thus reproduced. Accordingly, the reproduction layer 3 first layer 31 is required to have a thickness allowing laser beam LB to be passed as appropriate. As has been described previously, the first layer 31 is 20 to 100 Å thick and can thus transmit laser beam LB sufficiently.

For a magneto optical recording medium transferring the recording layer's magnetic domain to the reproduction layer to reproduce a signal, the process as described above is applied thereto to do so. In contrast, for a magneto optical recording medium adopting a system applying an external magnetic field to enlarge and thus reproduce a magnetic domain transferred to the reproduction layer, following the FIG. 2 steps A and B an alternate magnetic field Hex is externally applied, and at a timing of applying that magnetic field of alternate magnetic field Hex in the same direction as the second layer's magnetic domain 320 magnetization 321, magnetic domain 320 is enlarged to magnetic domain 322, which is detected with a laser beam transmitted through the first layer 31, as shown in FIG. 2C. Then, at a timing of applying a magnetic field opposite in direction to the magnetic domain 320 magnetization 321 the enlarged magnetic domain 322 disappears and returns to the initial state, as shown in FIG. 2A. Through the FIGS. 2A, 2B and 2C process each magnetic domain of recording layer 5 is enlarged and transferred to the reproduction layer 3 second layer 32 and a signal is thus reproduced.

Figure 3:
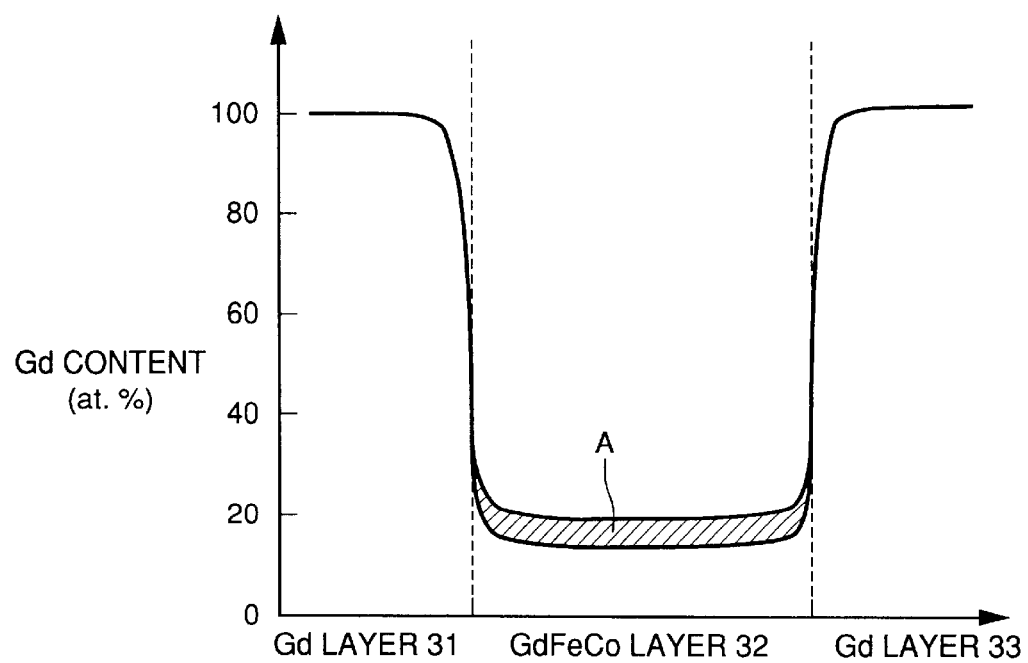
FIG. 3 represents the Gd content of the reproduction layer of the FIG. 1 magneto optical recording medium in the direction of its film thickness.

Reference will now be made to FIG. 3 to describe the distribution of the Gd content of reproduction layer 3 of the FIG. 1 magneto optical recording medium 10 in the direction of its thickness. The first and third layers 30 and 33 are formed of Gd and thus have a Gd content of 100 at. %. At the interface of the first and second layers 31 and 32, from the first layer 31 towards the second layer 32 the Gd content significantly reduces, and in the second layer 32 it is 15 to 20 at. % or in an area A in the figure. At the interface of the second and third layers 32 and 33, from the second layer 32 towards the third layer 33 the Gd content significantly increases, and in the third layer 33 it reaches 100 at. %.

FIG. 4 presents conditions for providing the Gd layer forming the reproduction layer 3 first and third layers 31 and 33. The first and third layers 31 and 33 are sputtered with Gd targeted, and an argon gas (Ar) flow rate, an RF power, a reaction pressure and a substrate temperature are provided as shown in FIG. 4.

FIG. 5 presents conditions for providing GdFeCo forming the reproduction layer 3 second layer 32. Gd and FeCo are targeted and an argon gas (Ar) flow rate, an RF power, a reaction pressure and a substrate temperature are provided as presented in FIG. 5. A Gd content is altered in the range of the FIG. 3 area A by controlling the power input to the Gd target and that input to the FeCo target independently from each other. For example, while the power input to the Gd target can remain constant while that input to the FeCo target can be controlled to deposit a film.

Figure 6:
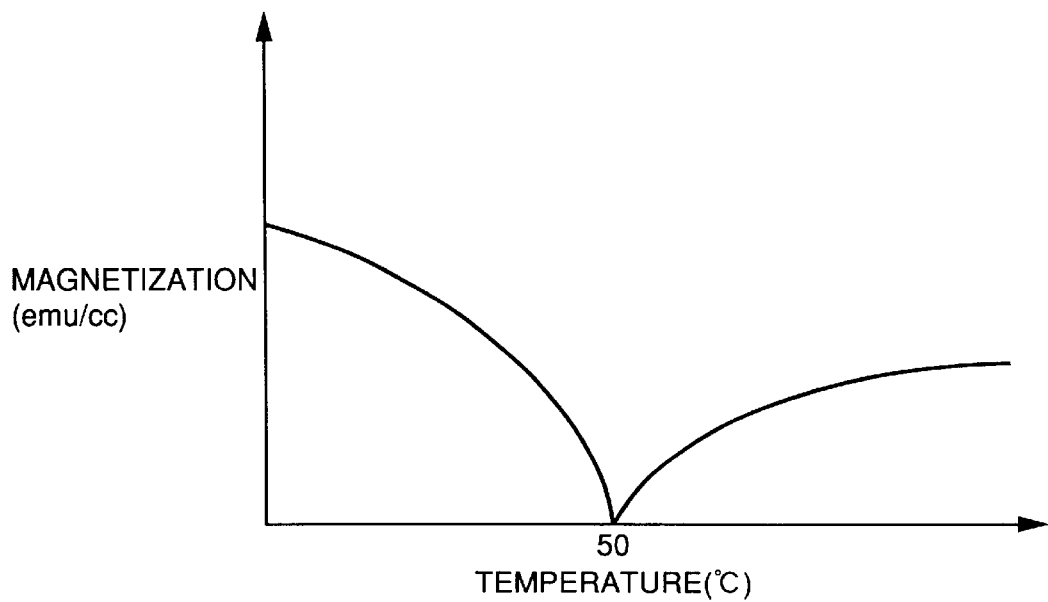
FIG. 6 represents dependency of magnetization on temperature with respect to Gd/GdFeCo/Gd.
Figure 7:
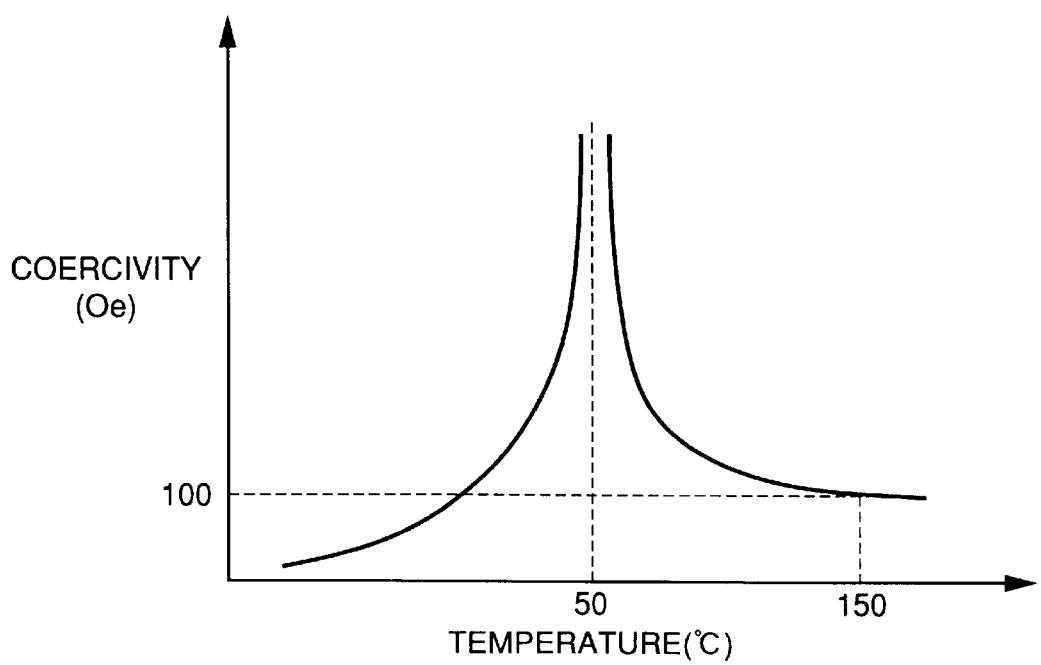
FIG. 7 represents dependency of coercive force on temperature with respect to Gd/GdFeCo/Gd.

FIGS. 6 and 7 represent magnetic characteristics of reproduction layer 3 of Gd/GdFeCo/Gd formed under the FIGS. 4 and 5 conditions. FIG. 6 represents dependency of magnetization on temperature. An area with magnetization reducing as temperature increases corresponds to a rare earth metal rich area, and an area with magnetization increasing as temperature increases corresponds to a transition metal rich area, with a compensation temperature of approximately 50° C.

FIG. 7 represents dependency of coercive force on temperature. As temperature increases coercive force gradually decreases and around a temperature for signal reproduction, i.e., approximately 150° C. it has a sufficiently small value of 100 Oe, having a magnitude allowing the recording layer 5 magnetic domain's leaking magnetic field to invert magnetization.

If the FIGS. 6 and 7 magnetic characteristics are implemented with a single layer of GdFeCo the Gd content is 18 to 23 at. %. With reproduction layer 3 having GdFeCo posed between Gd, as in the present invention, if GdFeCo has a Gd content reduced to 15 to 20 at. % the layer can be used as a reproduction layer detecting a magnetic domain transferred from the recording layer. Thus, posing GdFeCo in Gd can prevent Si atoms and N atoms forming dielectric layer 2 and non-magnetic layer 4 from entering GdFeCo and in particular prevent a characteristic from degrading at an interface.

Figure 8:
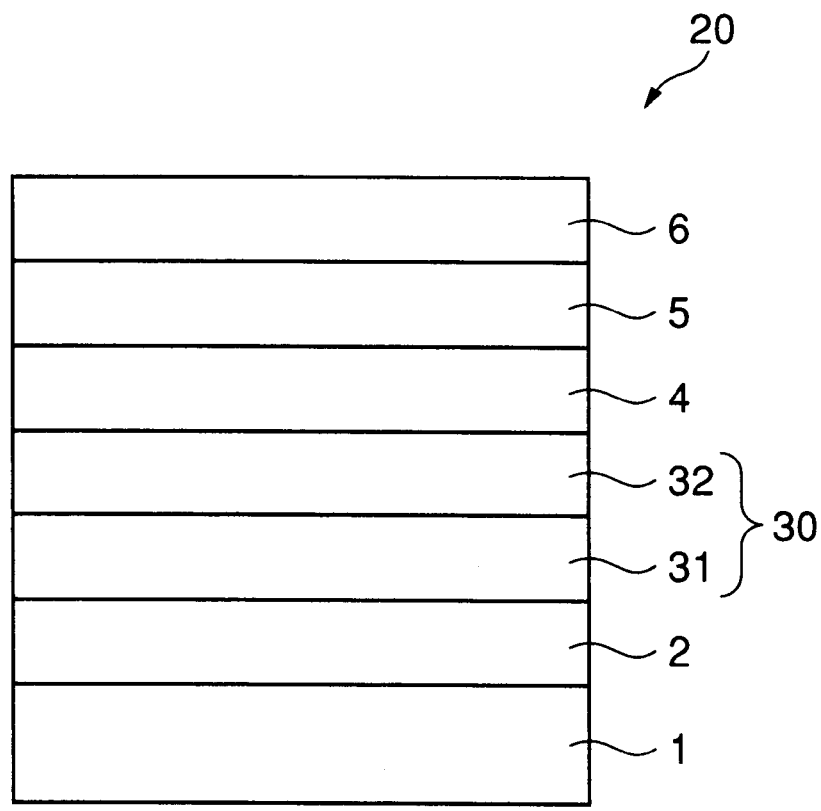
FIG. 8 shows another structure in cross section of the magneto optical recording medium in the present invention.

The present magneto optical recording medium is not limited to the FIG. 1 magneto optical recording medium 10 and may be the FIG. 8 magneto optical recording medium 20, which is identical in configuration to the FIG. 1 recording medium 10, except that reproduction layer 3 is replaced by a reproduction layer 30. Reproduction layer 30 is formed of the first layer 31 of Gd and the second layer 32 of GdFeCo. Reproduction layer 30 is 170 to 600Å thick, and the first layer 31 is 20 to 100 Å thick and the second layer 32 is 150 to 500 Å thick. The first layer 31 is formed in contact with dielectric layer 2. More specifically, magneto optical recording medium 20 has on the dielectric layer 2 side the first layer 31 to prevent Si atoms, N atoms and the like forming dielectric layer 2 from entering GdFeCo. Magneto optical recording medium 20, as well as magneto optical recording medium 10, can prevent reproduction layer 3 from having a degraded characteristic.

Figure 9A:
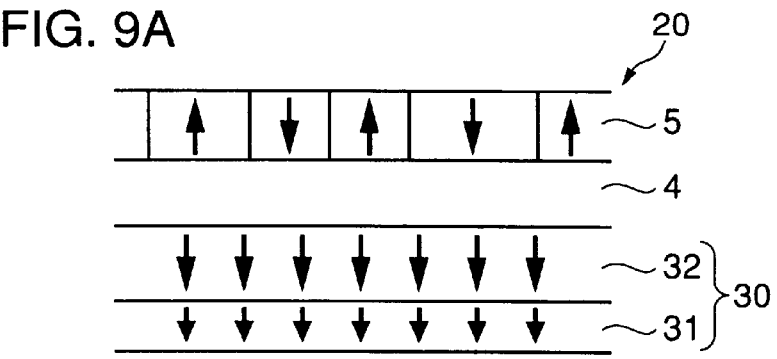
FIG. 9A is a cross section showing an initial stage in a process of reproducing a signal from the FIG. 8 magneto optical recording medium.
Figure 9B:
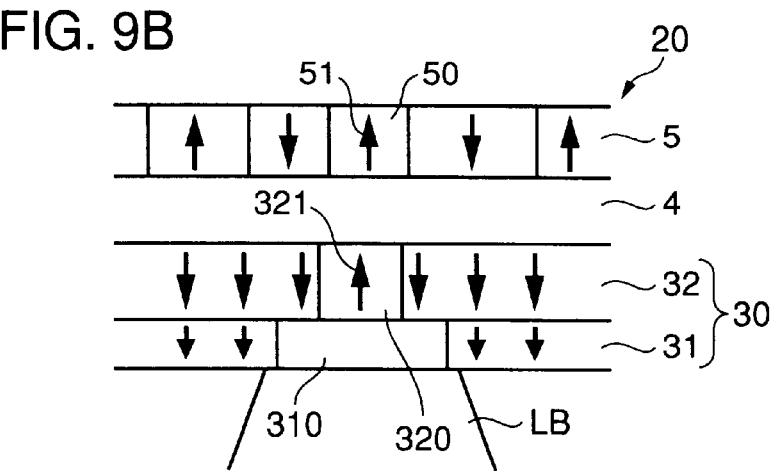
FIG. 9B is a cross section showing transferring a magnetic domain from a recording layer to a reproduction layer in the process of reproducing a signal from the FIG. 8 magneto optical recording medium.
Figure 9C:
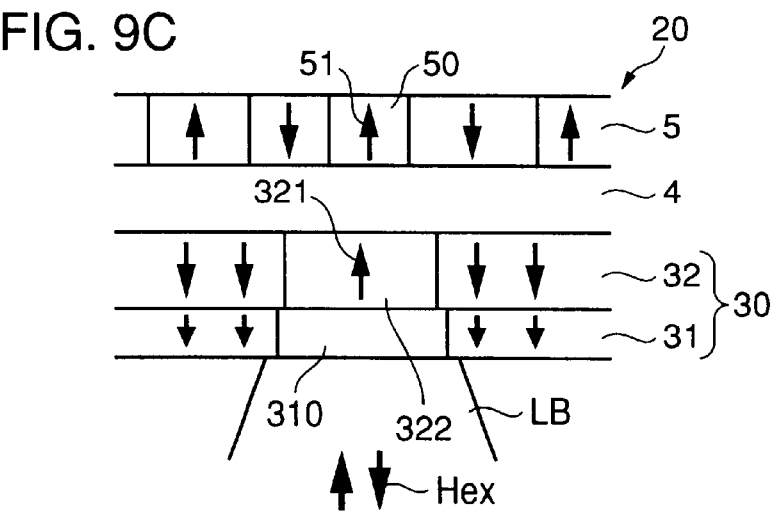
FIG. 9C is a cross section showing enlarging a magnetic field in the process of reproducing a signal from the FIG. 8 magneto optical recording medium.

Reference will now be made to FIGS. 9A–9C to describe a process of reproducing a signal from magneto optical recording medium 20. Magneto optical recording medium 20 in reproducing a signal also has the reproduction layer 30 first and second layers 31 and 32 having their magnetization initialized in a direction of an initializing magnetic field, as shown in FIG. 9A.

As shown in FIG. 9B, when the reproduction layer 30 at the first layer 31 receives laser beam LB of a predetermined intensity, recording layer 5 in a predetermined area is heated and a magnetic field leaking from magnetic domain 50 is intensified. The reproduction layer 30 first layer 31 is a metal layer of Gd and thus has as low a Curie point as 50° C. (room temperature). As such when laser beam LB is directed and a temperature for signal reproduction, i.e., approximately 150° C. is attained there is created in reproduction layer 3 at the first layer 31 an area 310 where magnetization has disappeared. Thus, the magnetic field leaking from the recording layer's magnetic domain 50 extends through non-magnetic layer 4 and thus reaches the reproduction layer's second layer 32 magnetic domain 320, which has magnetization 321 in the same direction as magnetization 51 held by magnetic domain 50 of recording layer 5 and the recording layer 5 magnetic domain 50 is transferred to the reproduction layer 30 second layer 32. Laser beam LB radiated on the first layer 31 side that is transmitted through the first layer 31 magnetooptically interacts with the second layer 32 magnetic domain 320, which is detected and a signal is thus reproduced. Accordingly, the reproduction layer 30 first layer 31 is required to have a thickness allowing laser beam LB to be passed as appropriate. As has been described above, the first layer 31 is 20 to 100 Å thick and can thus transmit laser beam LB sufficiently.

For a magneto optical recording medium transferring the recording layer's magnetic domain to the reproduction layer to reproduce a signal, the process as described above is applied thereto to do so. In contrast, for a magneto optical recording medium adopting a system applying an external magnetic field to enlarge and thus reproduce a magnetic domain transferred to the reproduction layer, following the FIG. 9 steps A and B an alternate magnetic field Hex is externally applied, and at a timing of applying that magnetic field of alternate magnetic field Hex in the same direction as the second layer's magnetic domain 320 magnetization 321, magnetic domain 320 is enlarged to magnetic domain 322, which is detected with a laser beam transmitted through the first layer 31, as shown in FIG. 9C. Then, at a timing of applying a magnetic field opposite in direction to the magnetic domain 322 magnetization 321 the enlarged magnetic domain 322 disappears and returns to the initial state, as shown in FIG. 9A. Through the FIGS. 9A, 9B and 9C process each magnetic domain of recording layer 5 is transferred to and enlarged in the reproduction layer 30 second layer 32 and a signal is thus reproduced.

In magneto optical recording medium 20, reproduction layer 30 has in the direction of its thickness a Gd content distributing as shown in FIG. 3 and magnetic characteristics as shown in FIGS. 6 and 7.

Figure 10:
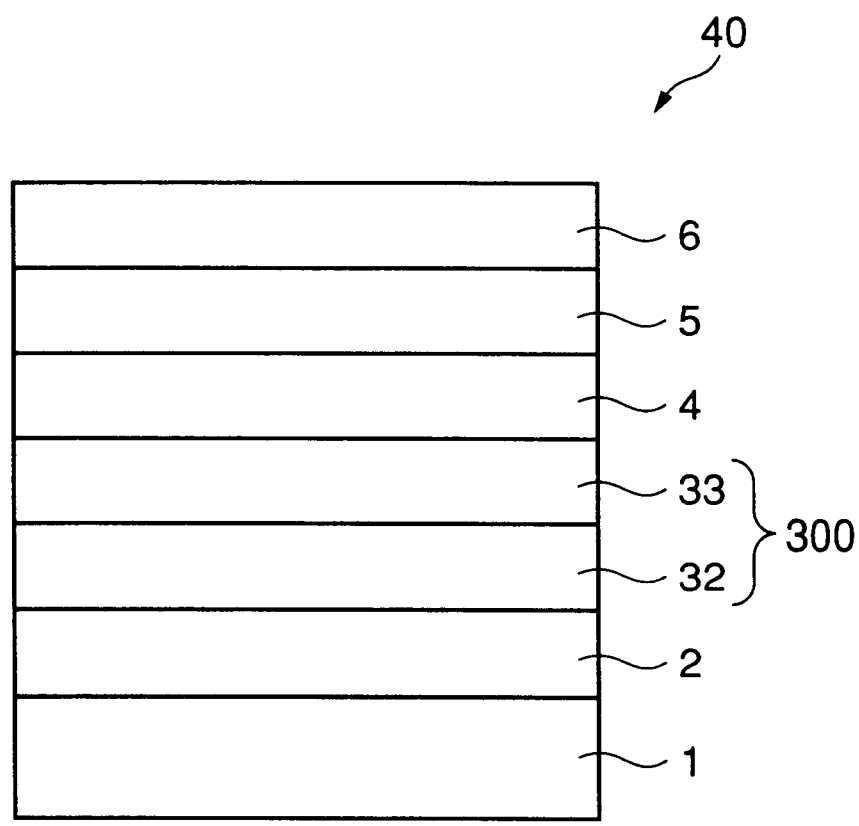
FIG. 10 shows still another structure in cross section of the magneto optical recording medium in the present invention.

The present magneto optical recording medium may be the FIG. 10 magneto optical recording medium 40, which is identical in configuration to the FIG. 1 magneto optical recording medium 10, except that reproduction layer 3 is replaced by a reproduction layer 300. Reproduction layer 300 is formed of the second layer 32 of GdFeCo and the third layer 33 of Gd. Reproduction layer 300 is 170 to 800 Å thick, and the second layer 32 is 150 to 500 Å thick and the third layer 33 is 20 to 300 Å thick. The third layer 33 is provided in contact with non-magnetic layer 4. More specifically, magneto optical recording medium 40 has on the non-magnetic layer 4 side the third layer 33 to prevent Si atoms, N atoms and the like forming non-magnetic layer 4 from entering GdFeCo. Magneto optical recording medium 40, as well as magneto optical recording medium 10, can prevent reproduction layer 300 from having a degraded characteristic.

Figure 11A:
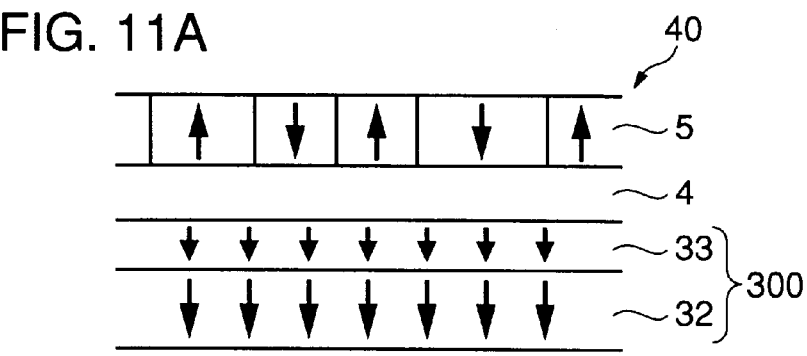
FIG. 11A is a cross section showing an initial stage in a process of reproducing a signal from the FIG. 10 magneto optical recording medium.
Figure 11B:
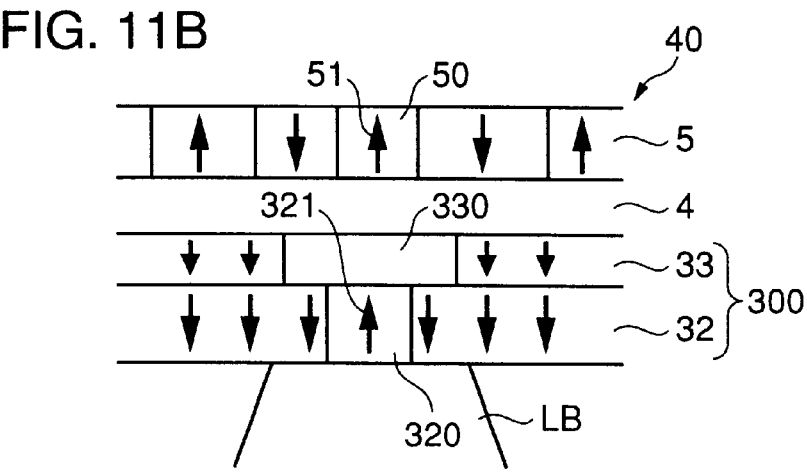
FIG. 11B is a cross section showing transferring a magnetic domain from a recording layer to a reproduction layer in the process of reproducing a signal from the FIG. 10 magneto optical recording medium.
Figure 11C:
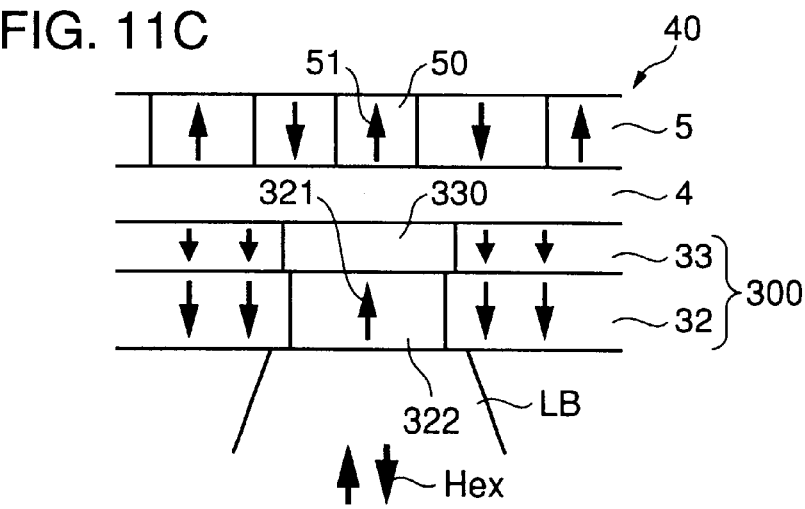
FIG. 11C is a cross section showing enlarging a magnetic field in the process of reproducing a signal from the FIG. 10 magneto optical recording medium.

Reference will now be made to FIGS. 11A–11C to describe a process of reproducing a signal from magneto optical recording medium 40. Magneto optical recording medium 40 in reproducing a signal also has the reproduction layer 300 second and third layers 32 and 33 having their magnetization initialized in a direction of an initializing magnetic field, as shown in FIG. 11A.

As shown in FIG. 11B, when the reproduction layer 300 at the second layer 32 receives laser beam LB of a predetermined intensity, recording layer 5 in a predetermined area is heated and a magnetic field leaking from magnetic domain 50 is intensified. The reproduction layer 300 third layer 33 is a metal layer of Gd and thus has as low a Curie temperature as 50° C. (room temperature). As such when laser beam LB is directed and a temperature for signal reproduction, i.e., approximately 150° C. is attained there is created in reproduction layer 300 at the third layer 33 an area 330 where magnetization has disappeared. Thus, the magnetic field leaking from the recording layer's magnetic domain 50 extends through non-magnetic layer 4 and area 330 and thus reaches the reproduction layer's second layer 32 magnetic domain 320, which has magnetization 321 in the same direction as magnetization 51 held by magnetic domain 50 of recording layer 5 and the recording layer 5 magnetic domain 50 is transferred to the reproduction layer 300 second layer 32. Laser beam LB radiated on the second layer 32 side magnetooptically interacts with the second layer 32 magnetic domain 320, which is detected and a signal is thus reproduced.

For a magneto optical recording medium transferring the recording layer's magnetic domain to the reproduction layer to reproduce a signal, the process as described above is applied thereto to do so. In contrast, for a magneto optical recording medium adopting a system applying an external magnetic field to enlarge and thus reproduce a magnetic domain transferred to the reproduction layer, following the FIG. 11 steps A and B an alternate magnetic field Hex is externally applied, and at a timing of applying that magnetic field of alternate magnetic field Hex in the same direction as the second layer's magnetic domain 320 magnetization 321, magnetic domain 320 is enlarged to magnetic domain 322, which is detected with a laser beam transmitted through the first layer 31, as shown in FIG. 11C. Then, at a timing of applying a magnetic field opposite in direction to the magnetic domain 322 magnetization 321 the enlarged magnetic domain 322 disappears and returns to the initial state, as shown in FIG. 11A. Through the FIGS. 11A, 11B and 11C process each magnetic domain of recording layer 5 is transferred to and enlarged in the reproduction layer 300 second layer 32 and a signal is thus reproduced.

In magneto optical recording medium 40, reproduction layer 300 has in the direction of its thickness a Gd content distributing as shown in FIG. 3 and magnetic characteristics as shown in FIGS. 6 and 7.

While in the above description a magneto optical recording medium has a reproduction layer with an alloy layer of rare earth metal and transition metal posed between rare earth metal layers, it may have a reproduction layer with an alloy layer of rare earth metal and transition metal posed between layers containing rare earth metal. More specifically, in the FIGS. 1, 8 and 10 first and third layers 31 and 33 may be Gd containing layers. More specifically, $Gd_x(FeCo)_{1-x}$ with x being 0.3 to 0.9 is applied to the first and third layers 31 and 33 and $Gd_x(FeCo)_{1-x}$ with x being 0.15 to 0.25 is applied to the second layer 32. Posing GdFeCo containing Gd of 0.15 to 0.25 in Gd-rich GdFeCo containing Gd of 0.3 to 0.9 of Gd can also prevent an element forming dielectric layer 2 or non-magnetic layer 4 from entering the second layer 32 and thus prevent reproduction layer 3 from having a degraded characteristic. Since $Gd_x(FeCo)_{1-x}$ with x being 0.3 to 0.9 contains more Gd than $Gd_x(FeCo)_{1-x}$ used for the second layer 32, the power input to the FeCo target is reduced in providing $Gd_x(FeCo)_{1-x}$ with x being 0.3 to 0.9.

Figure 12:
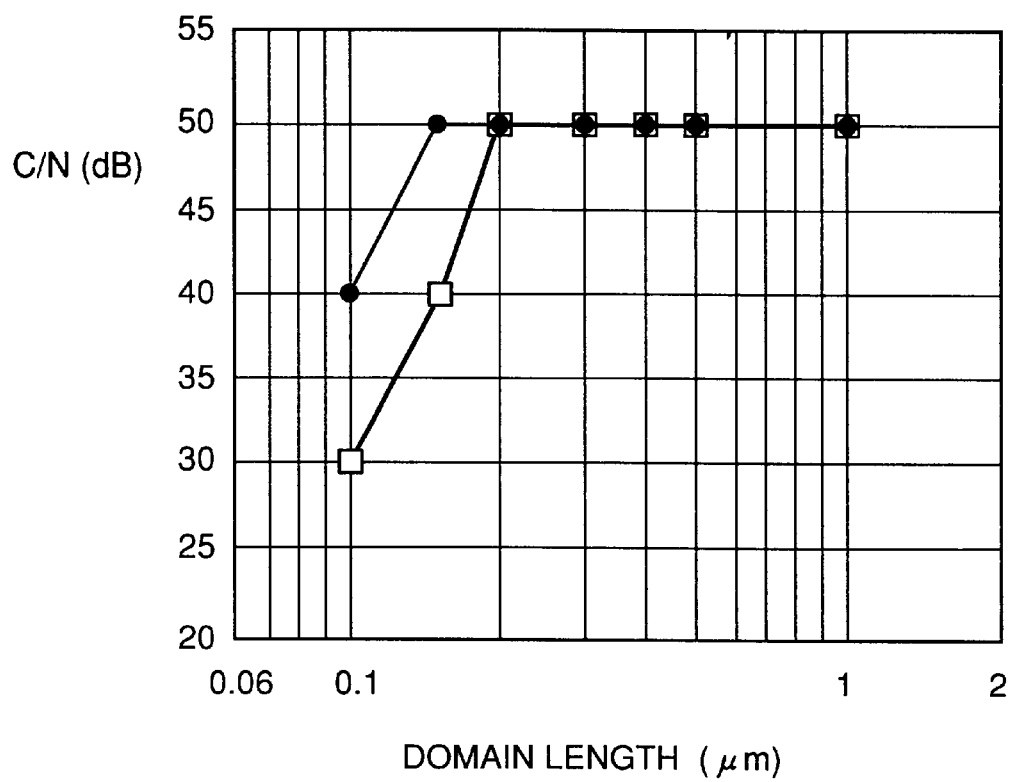
FIG. 12 shows a result of comparing the dependence on domain length of a characteristic of a signal reproduced from magneto-optical recording medium 10 of the present invention with the dependency on domain length of a characteristic of a signal reproduced from a conventional magneto-optical recording medium.

Reference will now be made to FIG. 12 to describe a comparison between the dependence on domain length of a characteristic of a signal reproduced from magneto-optical recording medium 10 of the present invention and the dependence on domain length of a characteristic of a signal reproduced from a conventional magneto-optical recording medium. In FIG. 12, the vertical axis represents C/N ratio and the horizontal axis represents domain length, and □ represents the dependence on domain length of the C/N ratio of the conventional magneto-optical recording medium and ● represents the dependence on domain length of the C/N ratio of magneto-optical recording medium 10. In this comparison, the second layer 32 of magneto-optical recording medium 10 and a reproducing layer of the conventional magneto-optical recording medium are both formed of GdFeCo having a composition of $Gd_{0.19}(FeCo)_{0.81}$. As is apparent from FIG. 12, magneto-optical recording medium 10 as compared with the conventional magneto-optical recording medium is improved, providing a C/N ratio increasing by approximately 10 dB from 30 dB to 40 dB for a domain length of 0.1 μm. It can thus be found that a magnetic domain of approximately 0.1 μm in domain length can be successively reproduced.

It was also observed that as well as magneto-optical recording medium 10, magneto-optical recording media 20, 40 of the present invention also provided an improved C/N ratio for the domain length of 0.1 μm, as compared with the conventional magneto-optical recording medium.

The reproduction layer's anisotropy can be increased, allowing a magneto optical recording medium of a domain enlargement and reproduction system to reliably enlarge and reproduce a magnetic domain. Furthermore, the above described magneto optical recording media 10, 20, 40 allow a signal to be reproduced with an improved resolution and a magnetic domain of approximately 0.1 μm to be reproduced successively.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto optical recording medium comprising:

a dielectric layer;

a reproduction layer formed in contact with said dielectric layer;

a non-magnetic layer formed in contact with said reproduction layer; and a recording layer formed in contact with said non-magnetic layer, said reproduction layer including a first layer consisting of a rare earth metal layer, a second layer corresponding to an alloy layer of rare earth metal and transition metal formed in contact with said first layer, and a third layer consisting of a rare earth metal layer formed in contact with said second layer.

2. A magneto optical recording medium comprising:

a dielectric layer;

a reproduction layer formed in contact with said dielectric layer;

a non-magnetic layer formed in contact with said reproduction layer; and a recording layer formed in contact with said non-magnetic layer, said reproduction layer including a first layer consisting of a rare earth metal layer formed in contact with said dielectric layer, and a second layer corresponding to an alloy layer of rare earth metal and transition metal.

3. A magneto optical recording medium comprising:

a reproduction layer;

a non-magnetic layer formed in contact with said reproduction layer; and a recording layer formed in contact with said non-magnetic layer, said reproduction layer being formed of a first layer corresponding to an alloy layer of rare earth metal and transition metal and a second layer consisting of a rare earth metal layer formed in contact with said non-magnetic layer.

4. The magneto optical recording medium of claim 1, wherein said rare earth metal layer is a Gd layer and the rare earth metal forming said alloy layer is Gd.

5. A magneto optical recording medium comprising:

a dielectric layer;

a reproduction layer formed in contact with said dielectric layer;

a non-magnetic layer formed in contact with said reproduction layer; and a recording layer formed in contact with said non-magnetic layer, wherein said reproduction layer is an alloy layer of rare earth metal and transition metal and contains only said rare earth metal at a portion thereof closer to said dielectric layer and a portion thereof closer to said non-magnetic layer.

* * * * *